UNITED STATES PATENT OFFICE.

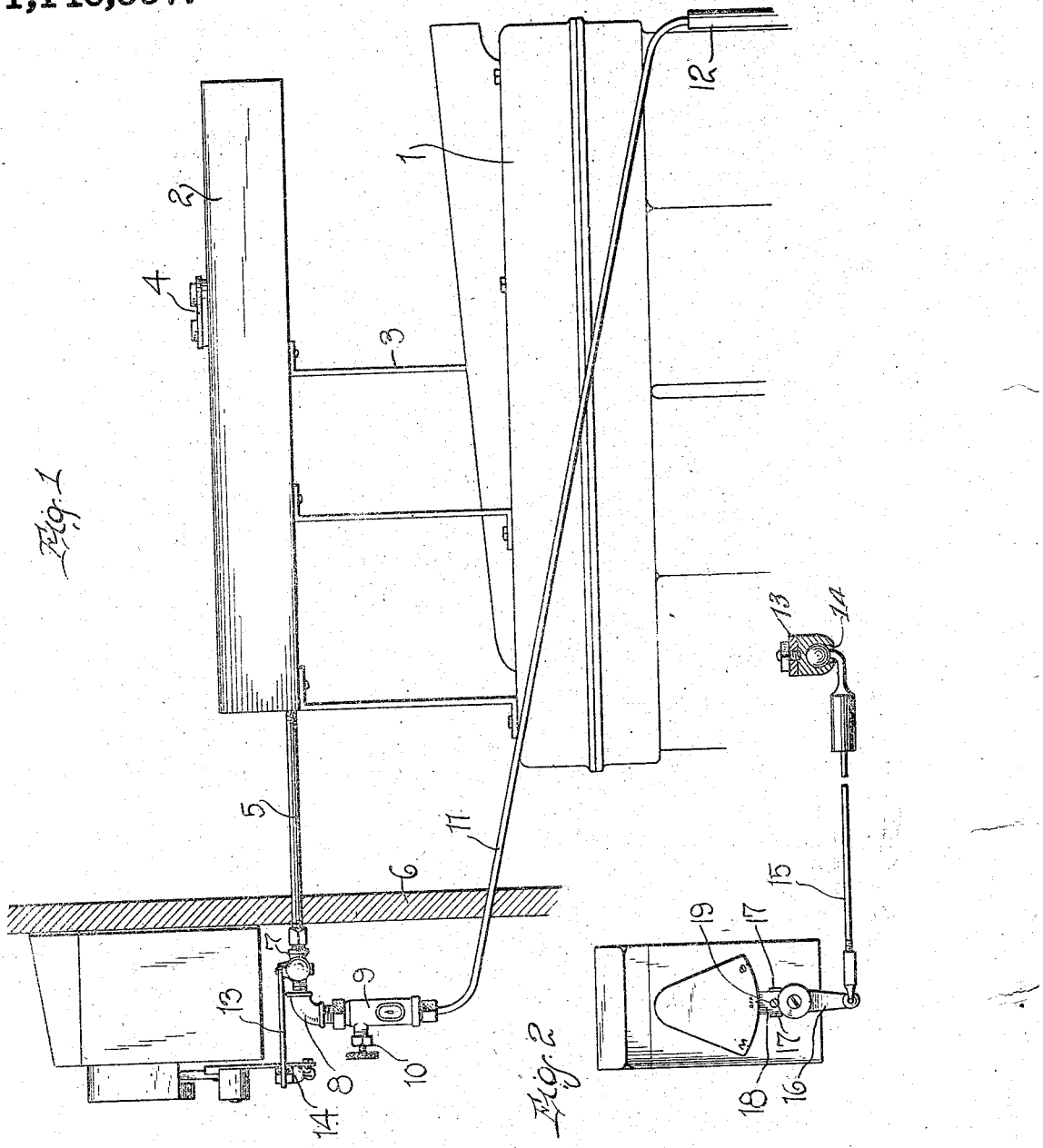

ORLAF ANDERSON, OF WAUSAU, WISCONSIN.

LUBRICATOR.

1,140,557.

Specification of Letters Patent.

Patented May 25, 1915.

Application filed April 18, 1914. Serial No. 832,933.

*To all whom it may concern:*

Be it known that I, ORLAF ANDERSON, a citizen of the United States, residing at Wausau, in the county of Marathon and State of Wisconsin, have invented certain new and useful Improvements in Lubricators, of which the following is a specification, reference being had to the accompanying drawings.

This invention relates to new and useful improvements in lubricating devices and more particularly to a device of this character which is adapted for use upon automobile engines, the main object of the present invention being the provision of a lubricating device whereby the engine will be automatically supplied with oil, while in motion, the supply being controlled by the actuation of the magneto controller, whereby the supply of oil will be stopped when the engine is stopped and turned on upon the starting of the engine.

Another object of the invention is the provision of a device of this character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a side elevation illustrating my improved oiler, as applied to an automobile engine; and Fig. 2 is a front elevation of the switch box, illustrating the connection between the switch box and the controller.

Referring more particularly to the drawing, 1 indicates an automobile engine which may be of any general type and mounted thereon is a supply tank 2, which is supported upon the engine by means of the standards 3, the ends of which are bent laterally in opposite directions, one end being bolted or otherwise secured to the supply tank 2, while the other end is bolted or otherwise secured to the engine 1. The tank 2 is provided upon its upper face with an opening adapted to be centrally closed by means of a removable plug 4, whereby the tank may be readily filled, when desired. The rear end of the tank is provided with an outlet opening and connected therewith is a conveying pipe 5, which extends through a suitable opening formed in the dash board 6 of the motor vehicle, and is connected upon the inner side of the dash board with a valve 7 and connected with the other end of the valve is an elbow 8. Removably connected to the lower end of the elbow 8, is what will be hereinafter known as a sight drip feed device which is generally indicated by the numeral 9 and which is provided with an opening covered with any suitable transparent material, whereby the interior of the device is visible so that the operator can readily tell whether the device is in working order or not.

The feed device 9 is provided with a regulating valve 10, whereby the discharge of the oil may be regulated according to the amount desired. It will be understood that the valve 7 is to be used in cutting off the supply of oil from the tank 2, when so desided. Connected with the lower end of the feed device 9, is a tube 11 which extends down through the dash below the pipe 5 and thence extends along the engine to the breather pipe 12, to which the same is connected, said breather pipe having communication with the crank case, to which the oil is to be supplied. Connected with the valve member 7, is an outwardly projecting arm 13 having a removable socket member 14 carried by the outer end thereof, in which the end of the connecting rod 15 is arranged, whereby to loosely connect the arm 13 with the rod 15 to open and close the valve 7 upon the reciprocating movement of the rod 15. The inner end of the rod 15 is loosely connected to the lower end of an arm 16, the upper end of which is provided with spaced flanges 17 adapted to be arranged upon opposite sides of the control lever 18 and said control lever is rigidly secured to the arm 16, by means of a screw 19 which is removably arranged within the arm 18 and extends through the arm 16.

The connection between the arm 16 and the rod 15 is preferably of the ball and socket type, whereby said members will have a free and easy movement upon the actuation of the control lever 18. From this it will be apparent that when it is desired to start the engine, the control lever 18 will be moved laterally to connect the engine with the magneto, this movement reciprocating the rod 15 which will actuate the arm 13 and open the valve 7, whereby the flow of oil from the tank 2 through the tube 11 to the breather pipe 12 is open and, from this it will be seen that the engine is constantly supplied with oil during the running period of the same. It will also be apparent from the above description, taken in connection with the drawing, that my improved oiling device can be quickly and readily applied to any make of engine of this type, and the supply of oil from the tank 2 to the engine crank case may be regulated through the medium of the valve member 10 and should the device become inoperative, it will be readily visible to the operator through the medium of the sight feed drip device 9, so that my improved feed oiler, as herein shown and described, is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the appended claims.

Having thus described this invention, what I claim is:—

1. A device of the class described including a supply tank, and a valve member arranged at the outer end thereof, a feed device, means connecting the valve with the feed device, a tube having connection with the breather pipe of an engine and having connection with the feed device, a movable arm connected with the valve, a rod loosely connected to the outer end of said arm and means having loose connection with the rod, whereby to actuate said arm and open and close the valve to regulate the supply of oil from the tank to the breather pipe.

2. The combination with the operating arm of a magneto, of a supply tank, a discharge pipe connected therewith, a valve member arranged within the outer end of the discharge pipe, a feed device having connection with the valve, a discharge tube connected with the feed device, an arm connected with said valve, an operating rod loosely connected to the outer end of said arm, and a second arm having one end loosely connected to the outer end of the arm and its other end rigidly connected to the magneto arm, whereby to open and close said arm upon the actuation of the magneto arm, as and for the purpose set forth.

In testimony whereof I hereunto affix my signature in the presence of two witnesses.

ORLAF ANDERSON.

Witnesses:
  HELEN SLOAN,
  OTTO G. FEHLHABER.